Feb. 9, 1932.   K. R. D. WOLFE   1,844,814
COMBINATION MANIFOLD CONTROL AND FLUID REGULATOR
Filed June 3, 1931   3 Sheets-Sheet 3

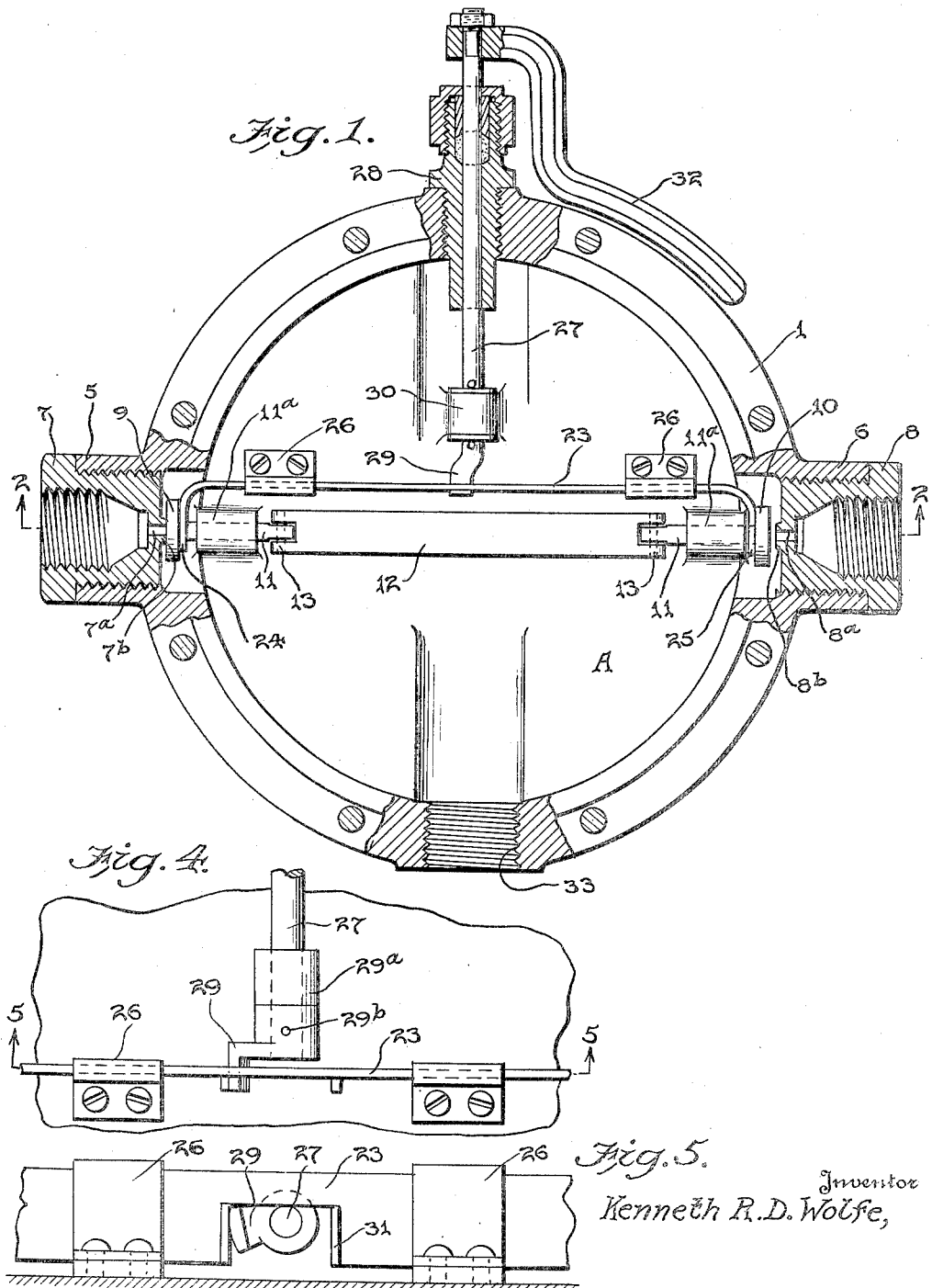

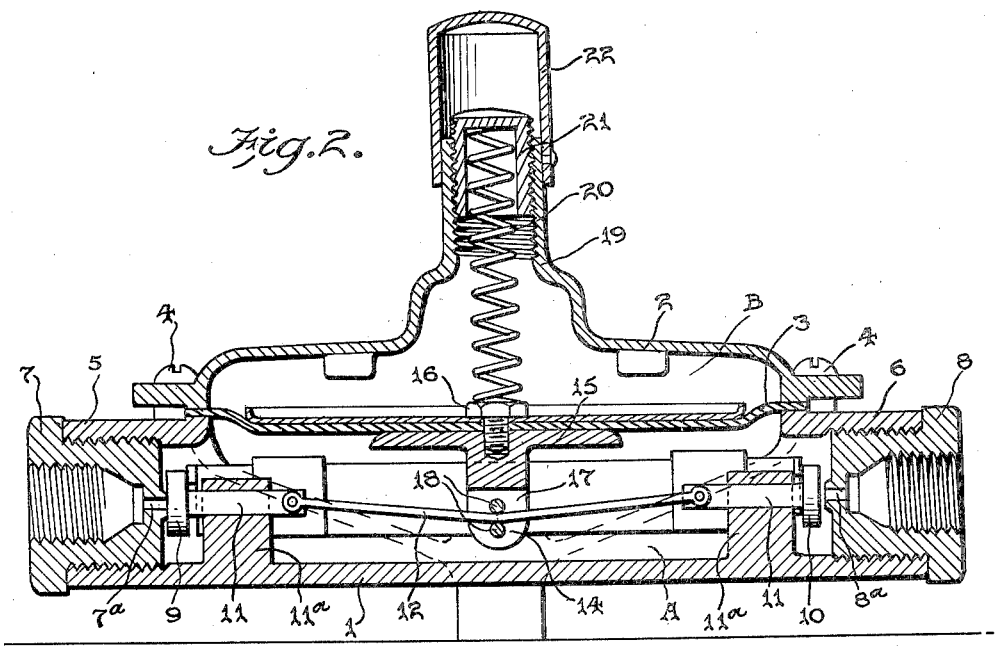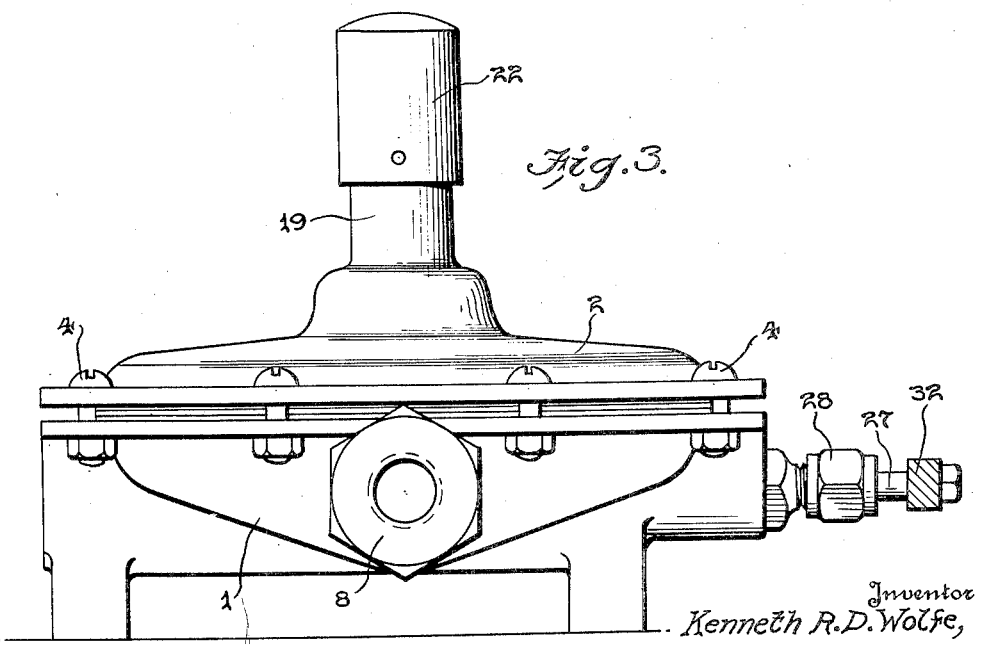

Inventor
Kenneth R. D. Wolfe,
By Prevost & Prevost
Attorneys

Patented Feb. 9, 1932

1,844,814

UNITED STATES PATENT OFFICE

KENNETH R. D. WOLFE, OF MARSHALLTOWN, IOWA, ASSIGNOR TO THE FISHER GOVERNOR COMPANY, OF MARSHALLTOWN, IOWA

COMBINATION MANIFOLD CONTROL AND FLUID REGULATOR

Application filed June 3, 1931. Serial No. 541,918.

My invention consists in new and useful improvements in a combination manifold control and fluid regulator and has for its object to provide a device which is designed not only to act as a pressure reducing valve but as a shut-off valve to open and close one or more of a plurality of inlets. Although the invention may be employed in various different types of apparatus, it is particularly applicable to a two-drum liquefied petroleum gas installation where it is desirable to alternately close one of the valves and permit the other valve to operate while one of the drums is being replaced, the closed or shut-off valve preventing any loss or leakage of the gas through the connection which is broken during the replacement of the drum or cylinder.

Another object of my invention is to provide an apparatus of this character wherein a plurality of valves are controlled by a single operating element, the arrangement being such that the valves will have uniform movement to and from their seats in accordance with the change in position of said operating element which in turn is controlled by the pressure of the fluid passing through said valves.

A further object of my invention is to provide a manually operated control for shifting the fluid supply from one inlet to the other, said control and valves being so interconnected as to operate either as an interchangeable single valve regulator or a multiple valve regulator.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts thoughout the several views, Fig. 1 is a plan view of the device with the top of the casing and diaphragm removed to illustrate the valve connecting means and manual control.

Figure 2 is a sectional view taken on line 2—2 of Fig. 1 with the top of the casing and diaphragm in place.

Fig. 3 is a view at right angles to Fig. 2.

Fig. 4 is an enlarged plan detail of one form of valve shifting mechanism.

Fig. 5 is a view taken on line 5—5 of Fig. 4.

Figure 6:
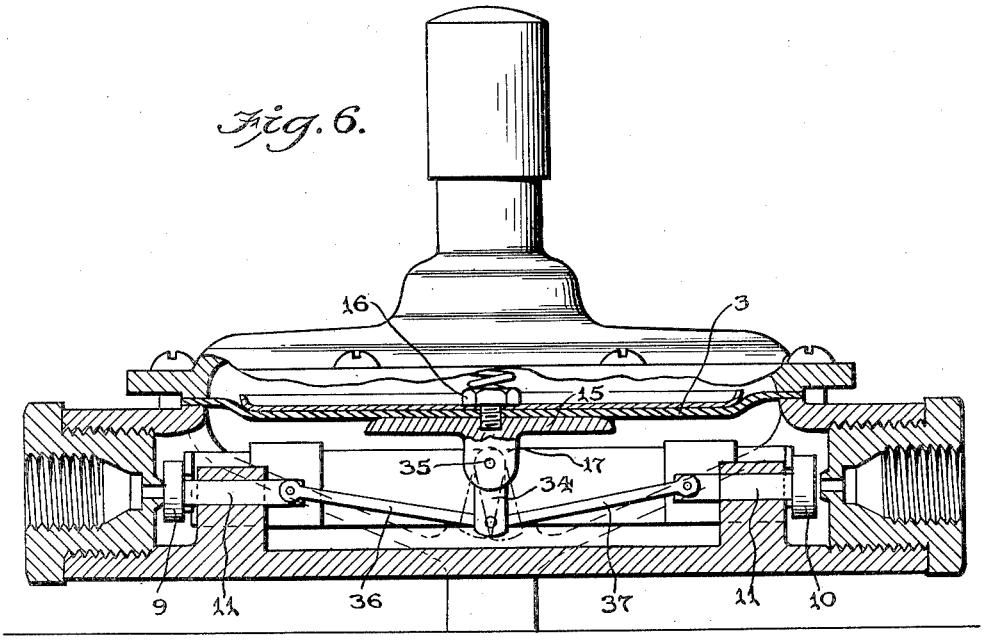
Fig. 6 is a view similar to Fig. 2 showing a modified form of valve and diaphragm connecting means.

In the drawings, 1 represents the regulator housing provided with a cover 2, a diaphragm 3 of any suitable type being interposed between said housing and cover and forming two superposed chambers A and B, completely sealed against one another. The cover and housing are preferably provided with suitable flanges and are secured together by bolts 4 or any other convenient means.

The housing 1 is cast with two oppositely disposed inlet bosses 5 and 6 which are internally threaded to accommodate threaded inlet plugs 7 and 8 respectively, each of which is internally threaded to receive a suitable connection and drilled centrally to form reduced inlet ports 7a and 8a which open into the chamber A, the inner extremities of said ports terminating in suitable raised valve seats 7b and 8b. Adjacent each of the valve seats 7b and 8b I provide a valve head 9 and 10 respectively, terminating in elongated reduced stems 11, the inner extremities of which are interconnected, in the form shown in Figs. 1 and 2, by a single strip of flexible material, preferably formed of a flat leaf spring 12, the ends of which are bifurcated to receive the respective ends of the stems 11 where they are pivotally connected by transverse pins 13.

The valve stems 11 are slidably supported horizontally in the chamber A by suitable posts 11a which may be cast integrally with the housing 1 and extend vertically in the chamber A adjacent each of the inlet ports 7a and 8a, said posts being apertured to slidably receive said stems.

14 represents a diaphragm stud which projects downwardly from the underside of the diaphragm into the chamber A, said stud being flanged at its upper extremity as at 15 to firmly engage the under-surface of the diaphragm 3, it being secured in place by a bolt 16 which extends through the diaphragm and into the stud. The lower end of the stud 14 is bifurcated as at 17 to receive a portion of the spring 12 and is provided immediately above and below said spring with transverse pins or rollers 18 which either slidably or rotatably engage the upper and lower surfaces of said spring, whereby the vertical movement of the diaphragm is transmitted to the spring 12 and in turn to the valve or valves 9 and 10 as hereinafter described more in detail.

The chamber B is provided with an upwardly projecting neck 19 which encloses a coil spring or the like 20, the lower end of which engages the upper surface of the diaphragm 3, its upper end being adjustably retained in the neck 19 by a threaded hollow plug 21 adapted to be screwed into the neck 19 as clearly shown in Fig. 2. Thus the pressure in the chamber A may be opposed by any desired force in the chamber B by regulating the plug 21 to compress or expand the spring 20. A suitable cap 22 is preferably provided on the end of the neck 19 as a closure and protecting means for the adjusting plug 21.

My improved valve shifting and locking means will be best understood by referring to Figs. 1, 4 and 5, and comprises a thin strip of metal or yoke 23 which extends straight across the chamber A for the greater portion of its length with its ends bent transversely at substantially right angles to form arms 24 and 25, said arms being apertured to receive and slidably engage the stem 11 of the valve heads 9 and 10. The straight portion of the yoke 23 is slidably supported in suitable brackets or guides 26 which are secured to the floor of the housing 1 by any convenient means such as bolts or screws and project upwardly within the chamber A. A stem 27 extends through an opening in the housing 1 at right angles to the yoke 23, said opening being fitted with a suitable journal and stuffing box 28 whereby escape of the pressure in the chamber A is prevented. The inner end of the stem 27 is provided with a cam arm 29 which may be formed by simply bending the end of the stem to the proper shape as shown in Fig. 1, or may be a separately constructed element as shown in Figs. 4 and 5, consisting of a collar 29a having an integral angular cam arm extending therefrom, said collar 29a being secured to the end of the stem 27 by a pin or the like 29b.

The cam end of the stem 27 is rotatably supported within the chamber A by a journal post 30, Fig. 1, and the stem 27 is so positioned that the cam arm 29 projects through a slot or recess 31 in the straight portion of the valve shifting strip or yoke 23, whereby when the stem 27 is rotated in either direction, the cam arm 29 will engage one side or the other of the recess 31 and cause a corresponding shifting of the yoke 23 to lock or release the valve or valves 9 and 10 as hereinafter set forth. The outer end of the stem 27 projects beyond the stuffing box 28 and is provided with a manual control lever or the like 32 whereby the rotation of the stem 27 may be accomplished from the exterior of the housing 1. While I have shown a lever 32, it is obvious that this is simply for the purpose of illustration and that a hand-wheel crank or any other suitable operating member may be employed with equal efficiency.

At a suitable point or points in the housing 1, I provide a discharge outlet 33 and although in the drawings this outlet is shown located at right angles to the inlet ports, it may be arranged at any desired point or points in the housing.

Having thus described the construction and arrangement of parts of one form of my invention, its operation is as follows:—

Assuming for the purpose of illustration that my combination manifold control and fluid regulator is to be employed in connection with a two-drum liquefied petroleum gas installation where it is necessary to alternately close the opposite inlet valves when the respective drums are being replaced, without affecting the operation of the regulator. The drums containing liquefied petroleum gas are connected through suitable conduits not shown, to the inlet plugs 7 and 8 and the lever 32 is rotated to the right to the position shown in Fig. 1, which rotation, through the medium of the stem 27 and cam arm 29, causes the valve shifting yoke 23 to slide to the left, the arm 24 sliding on the valve stem 11 and engaging just behind the head of valve 9 which firmly locks said valve against the seat 7b and closes the inlet port 7a. In this position the valve 10 is free to slide to and from its seat 8b to perform its regulating function.

As the pressure in the chamber A, which by the way is indicative of the pressure throughout the system connected to the discharge outlet 33, increases beyond a predetermined point, the diaphragm 3 is forced upwardly against the pressure of the spring 20, causing the spring strip 12 to be straightened out. This naturally forces the opposite ends of the spring strip 12 away from one another which tends to close the valve 10, the valve 9 having been locked in a stationary position as before pointed out. Thus the volume and flow of the incoming fluid passing through port 8a is reduced and the pressure in chamber A, in contact with diaphragm 3 is regulated and maintained at a uniform value. Now, when the pressure in the system and chamber A falls below a predetermined point, the pressure of the spring 20 in chamber B overcomes the fluid pressure in chamber A and forces the diaphragm downwardly which tends to bow the spring strip 12 and consequently withdraw the valve 10 from its seat to permit the in-flow of more fluid through port 8a.

When the fluid in the drum connected to the inlet plug 8 has become exhausted, the lever 32 is rotated to the left, thus sliding the shifting yoke 23 in the opposite direction, closing the valve 10 and permitting the free operation of the valve 9 without interruption of the fluid flowing into the system.

My regulator may also be employed in installations where fluid from two sources is to be mixed and conducted to a single outlet. In this event the lever 32 is rotated to a vertical position so that the cam arm 29 will be disengaged from either side of the recess 31 in the shifting yoke 23, thus rendering the valve shifting and locking means inoperative. In this position of parts it will be seen that both valves 9 and 10 are free to operate simultaneously upon the movement of the diaphragm and connecting strip 12.

Figure 7:
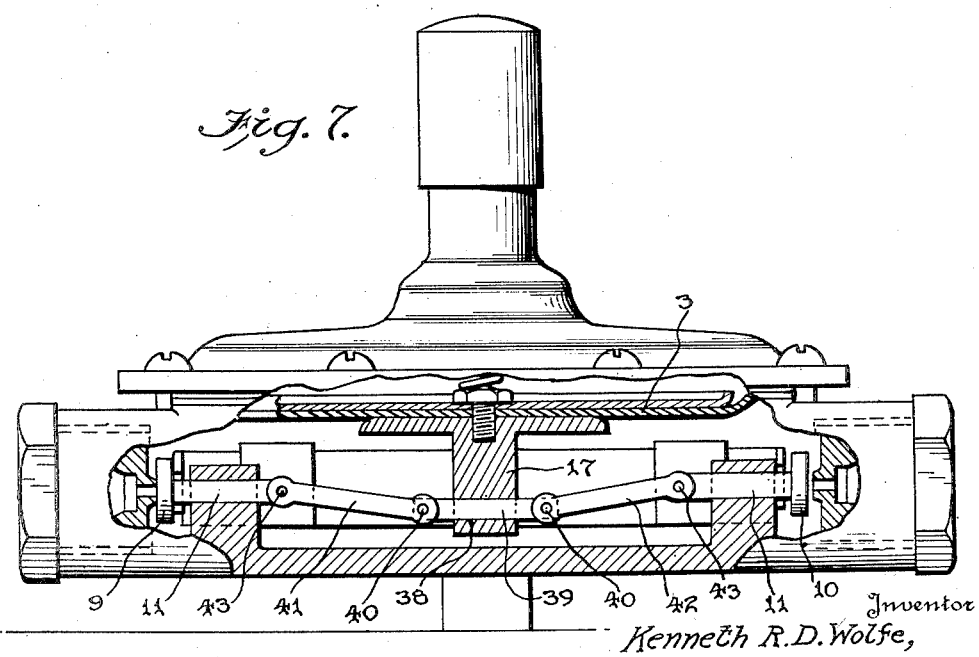
Fig. 7 is a similar view showing a further modification.

The modifications shown in Figs. 6 and 7 operate substantially the same as that just described, the only difference being in the details of construction relative to the manner of interconnecting the valve stems and diaphragm stud.

In Fig. 6 the diaphragm stud 17 carries a pivoted arm 34 connected at its upper end to said stud by a pin 35, its lower end being pivotally connected to the adjacent ends of two toggle levers 36 and 37. These toggle levers are pivotally secured at their opposite ends to the valve stems 11 and thus take the place of the valve connecting strip 12 shown in Figs. 1 and 2, the vertical movement of the diaphragm 3 being transmitted to the valve or valves 9 and 10 as hereinbefore set out.

In Fig. 7, the diaphragm stud 17 is provided with a transverse slot or opening 38 adapted to slidably engage a central toggle lever 39, the opposite extremities of which are pivotally secured as at 40 to toggle levers 41 and 42, the outer ends of the latter toggle levers being pivoted as at 43 to the valve stems 11.

As in the other forms of the invention, the movement of the diaphragm 3 is transmitted to the valves 9 and 10 by the interconnecting elements. The sliding engagement of the central toggle lever 39 with the slot 38 in the diaphragm stud 17 permitting the shifting of the valves by the manual control without interfering with the operation of the free valve.

From the foregoing it is believed that the objects, advantages and operation of the various forms of my invention may be readily understood by those skilled in the art, it being borne in mind that numerous changes may be made in the details of construction and application of the device without departing from the spirit of the invention as set forth in the following claims.

What I claim and desire to secure by Letters Patent is:—

1. A fluid regulator comprising a casing, a pressure-responsive element in said casing, a plurality of inlet ports and at least one outlet port in said casing, valves adapted to close said inlets, means for inter-connecting said valves and said pressure-responsive element whereby the movement of said pressure-responsive element may be transmitted to said valves, and independent means for locking one of said valves in closed position.

2. A fluid regulator comprising a casing, a pressure-responsive element in said casing, a plurality of inlet ports and at least one outlet port in said casing, valves adapted to close said inlets, means for inter-connecting said valves and said pressure-responsive element whereby the movement of said pressure-responsive element may be transmitted to said valves, and independent means for alternately shifting said valves to lock one or another in closed position.

3. A fluid regulator comprising a casing, a pressure-responsive element in said casing, oppositely disposed inlet ports in said casing, an outlet port arranged at an angle to said inlet ports, valves for closing said inlet ports, a toggle member for inter-connecting said valves, and means on said pressure-responsive element operatively engaging said toggle member.

4. A fluid regulator comprising a casing, a pressure-responsive element in said casing, oppositely disposed inlet ports in said casing, an outlet port arranged at an angle to said inlet ports, valves for closing said inlet ports, a toggle member for inter-connecting said valves, means on said pressure-responsive element operatively engaging said toggle member, and independent means for shifting said valves to alternately lock one or the other in closed position.

5. A fluid regulator comprising a casing, a pressure-responsive element in said casing, oppositely disposed inlet ports in said casing, an outlet port arranged at an angle to said inlet ports, valves for closing said inlet ports, a toggle member for inter-connecting said valves, means on said pressure-responsive element operatively engaging said toggle member, and independent means for shifting said valves to alternately lock one or the other in closed position, said last named means being adapted to remain inoperative to permit the simultaneous opening and closing of said valves.

6. A fluid regulator as claimed in claim 5 wherein said toggle member comprises a single strip of flexible material secured at each end to opposite valves.

7. A fluid regulator as claimed in claim 5 wherein said toggle member consists of a series of toggle levers pivotally connected to opposite valves and to each other and a pivotal connection between said toggle levers and said pressure-responsive element.

8. A fluid regulator as claimed in claim 5 wherein said toggle member comprises a series of toggle levers pivotally connected to opposite valves and to each other, and means on said pressure-responsive element for slidably engaging one of said toggle levers whereby said toggle levers and valves may be shifted transversely with respect to the operating movement of said pressure-responsive element.

9. A fluid regulator comprising a casing, a pressure-responsive element in said casing, oppositely disposed inlet ports in said casing, valves adapted to close said ports, a toggle member inter-connecting said valves, means on said pressure-responsive element operatively engaging said toggle member, at least one discharge port in said casing, a yoke slidably engaging the stems of said valves, and means for reciprocating said yoke to lock one of said valves in closed position, permitting the other valve to operate freely upon the movement of said pressure-responsive element.

10. A fluid regulator as claimed in claim 9 wherein said means for shifting the yoke comprises a cam adapted to operatively engage said yoke, and means exterior of said casing for rotating said cam.

11. A fluid regulator as claimed in claim 9 wherein said means for shifting said yoke comprises a stem extending through the wall of said casing, a cam arm mounted on the inner end of said stem and operatively engaging said yoke, and means for manually rotating the cam.

12. A fluid regulator comprising a casing, a diaphragm dividing said casing into two chambers, oppositely disposed inlet ports and an outlet port in one of said chambers, valves for said inlet ports, stems on said valves, means in said chamber for slidably supporting said valves adjacent said ports, a toggle member inter-connecting said valve stems, means on said diaphragm for operatively engaging said toggle member, a yoke in said chamber slidably engaging said valve stems, means for supporting said yoke, a shaft extending through a stuffing box in the wall of said casing at substantially right angles to said yoke, a cam on the inner end of said shaft operatively engaging said yoke, means on the outer end of said shaft for manually rotating the cam to shift said yoke whereby one or the other of said valves may be locked in closed position, and adjustable means in the other chamber for opposing the pressure in said first named chamber.

13. A fluid regulator comprising a casing, a diaphragm dividing said casing into two chambers, oppositely disposed inlet ports and an outlet port in one of said chambers, valves for said inlet ports, a toggle member interconnecting said valves, means on said diaphragm for operatively engaging said toggle member, and means in the other chamber for opposing the pressure in said first named chamber, whereby the movement of said diaphragm is transmitted simultaneously to said valves.

In testimony whereof I affix my signature.
KENNETH R. D. WOLFE.